Sept. 20, 1932. D. E. BEYNON 1,877,793
BOAT FENDER
Filed Nov. 24, 1930

Inventor.
Donald Edmund Beynon.

Patented Sept. 20, 1932

1,877,793

UNITED STATES PATENT OFFICE

DONALD EDMUND BEYNON, OF TORONTO, ONTARIO, CANADA, ASSIGNOR TO DUNLOP TIRE AND RUBBER CORPORATION, OF BUFFALO, NEW YORK

BOAT FENDER

Application filed November 24, 1930. Serial No. 497,827.

The principal objects of the invention are to provide a fender which will present a body of great resiliency to protect the hull and rails of a boat from injury when making a landing, and to produce a fender of light weight which will float indefinitely in water and will withstand a great amount of wear and tear.

The principal feature of the invention consists in forming the bumper body of a cellular rubber structure encased within a tough resilient rubber cover.

In the accompanying drawings, Figure 1 is a perspective view of a boat fender constructed in accordance with this invention.

Figures 1, 2, 3:
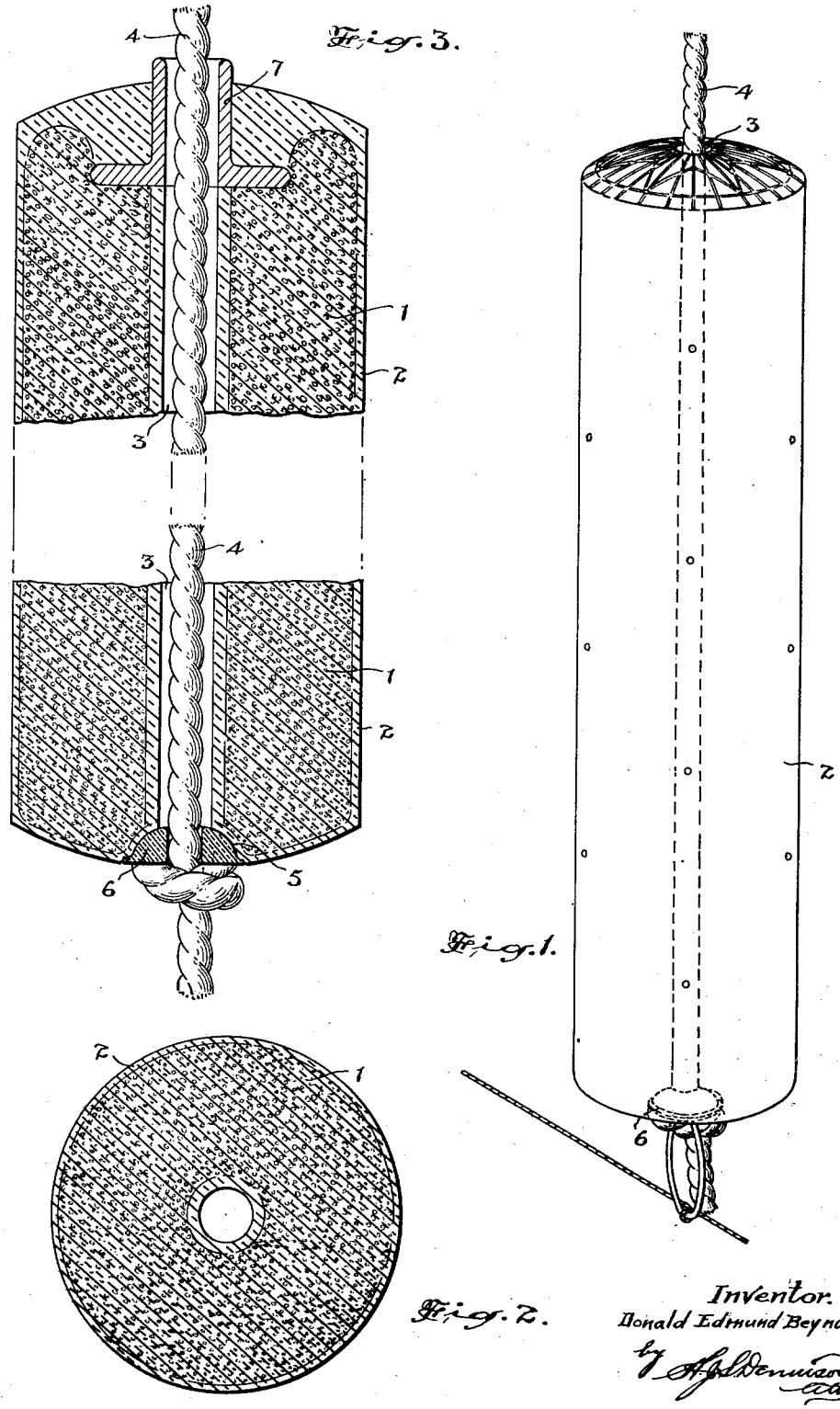
Figure 2 is an enlarged cross section of a fender.
Figure 3 is a longitudinal mid-section of a portion of a slightly modified form of fender.

It has been the custom to make boat fenders of a casing of plaited hempen rope filled with hemp, cork or other materials, but even the best of these have a very short life. The constant squeezing, rolling and scrubbing between the boat hull and wharves frays and pulps the rope and pulverizes the filling.

These fenders when torn off or dropped in the water rapidly become water-logged and sink, or if made entirely of hemp they will sink immediately on striking the water if they become disconnected from their tie ropes.

According to the present invention the body of the fender is formed of a mass of sponge rubber 1, the cellular texture of which may be varied considerably as may the rubber constituent in accordance with the service for which the fender is desired. The outer cover or skin 2 is formed of non-cellular rubber of a tough, wear-resisting nature, such as that used in the manufacture of rubber vehicle tires and both casing and body are vulcanized simultaneously in a homogeneous structure.

The fender may be made with a hollow central core 3 of a similar nature to the outer cover which thus forms a case of tough rubber completely enveloping the cellular body 1 and the rope lanyard 4 may be rove therethrough and knotted at the ends.

It is preferable to mould the fender with a cupped recess 5 at the bottom end and to provide a heavy washer 6 of hard rubber or metal to fit into the recess and to effectively prevent the lanyard from pulling through the fender.

It may be found desirable for certain classes of fenders to mould the rubber around a wire rope or chain, the rubber being vulcanized into the mesh or groves in the wire rope or chain.

For the purpose of extra strength it may be found desirable to place a flanged collar 7 of hard rubber or metal at the top end of the fender and to mould it into the rubber mass, as illustrated in Figure 3. If a metal collar 7 is used with a metal lanyard the collar may be soldered or brazed to the lanyard.

The wear-resisting quality of rubber is well known and a fender constructed as described will successfully withstand very severe usage. The cellular structure renders the fender comparatively light in weight and it is very resilient. Further, the cellular structure containing small globules of gas is much lighter than water and the fender cannot sink.

A further important feature is that the fenders are not only very neat in appearance but their surfaces are quite smooth and they will not scuff or mar the boat hull in rubbing between the hull and a wharf.

What I claim as my invention is:

1. A buoyant boat fender formed of a cellular rubber body completely sealed within a rubber covering, the total volume of said covering representing only a fraction of the volume of the said cellular body whereby maximum resiliency and buoyancy is obtained and access of water to the inner cellular rubber body obviated.

2. A buoyant boat fender comprising a cellular rubber body encircling a tubular sealing core and having a sealing skin of rubber enclosing the sides and ends of said cellular body and sealed to said tubular sealing core, said tubular core and sealing skin having a combined volume considerably less than the volume of said cellular rubber body.

3. A buoyant boat fender comprising a hollow tubular core of non-cellular rubber surrounded by a body of rubber in cellular form and enclosed on the outer side and ends by an outer casing of non-cellular rubber all vulcanized together into a completely sealed homogeneous structure, the total displacement volume of said core and outer casing being materially less than that of the cellular body.

4. A buoyant boat fender formed of a cellular rubber body completely sealed within a thin rubber covering whereby maximum resiliency and buoyancy is obtained and access of water to the inner cellular rubber body is obviated, said fender having a central passage therethrough for the reception of a fastening rope or the like, and a flanged sleeve embedded in the end of said fender and forming a reinforcing continuation of the wall of said passage to minimize wear thereon.

5. A buoyant boat fender formed of a sealed body of porous rubber having a central passage therethrough to receive a fastening rope, said passage being flared at one end to form a seat recess, and a bearing ring to receive the rope formed to extend into said seat recess and engage the same in bearing contact.

DONALD EDMUND BEYNON.